July 10, 1934.  J. J. ROBAK  1,966,358
WORM GEARING
Filed Oct. 4, 1933

INVENTOR
John J. Robak.
BY
Louis Necho
ATTORNEY

Patented July 10, 1934

1,966,358

UNITED STATES PATENT OFFICE 1,966,358

WORM GEARING

John J. Robak, Philadelphia, Pa.

Application October 4, 1933, Serial No. 692,066

6 Claims. (Cl. 74—458)

My invention relates to new and useful worm gearing in which adjustment can be effected by the axial movement of the worm with respect to the worm wheel or the movement of the worm wheel axially of the worm, in order to prevent the back-lash which develops as a result of wear on the meshing or engaging of the teeth of the worm wheel with the thread on the worm, as contradistinguished from the conventional means of adjusting a worm gearing by varying the center distance of the worm and gear without precluding the possibility of adjustment by conventional means.

It is a further object of my invention to produce a worm gearing in which, other things being equal, the range of available adjustment is proportionate to the length of the worm, which in turn varies with the constant differential initially provided between the constant opposite axial pitches on the opposite faces of the thread thereof.

A further object of my invention is to produce a novel worm gearing, the worm wheel of which may have its teeth cut or generated by a hob constructed from and representing the worm, to the end that the different opposite profile bearings of the teeth of the worm wheel may be cut simultaneously, thereby greatly reducing the cost of manufacture of said worm wheel and at the same time producing a worm wheel, the teeth of which have their opposite faces or profile bearings cut for maximum efficiency in meshing with the opposite different axial pitches of the worm thread, it being understood that the teeth of such worm wheel may be cut or generated by any other suitable methods now or hereinafter known in gear practice.

A still further object of my invention is to produce a worm gearing which possesses maximum efficiency in the profile bearing obtainable between the faces of the worm thread and the opposite sides of the worm wheel teeth, regardless of any axial adjustment to which the worm gearing may be subjected.

To the above ends, my invention consists of a novel worm gearing in which the worm, be it of a single or multiple thread, is provided with a constant axial pitch on one face or profile bearing of the thread thereof and with a different constant axial pitch on the opposite face or profile bearing of said thread, whereby the thread of said worm increases in thickness or cross section by a constant amount from one end of the worm to the other (measured along a line parallel to the axis of said worm), the increase in the width, thickness or cross section of said thread being accompanied by a corresponding decrease by a constant amount in the width of the spaces intervening between the successive convolutions of said thread (measured along the same line used for measurement of the worm thread).

My invention further consists of a worm wheel adapted for cooperation with a worm embodying my invention, the teeth of said worm wheel being preferably generated from a hob constructed from, corresponding to and representing said worm, it being understood that the teeth of the worm wheel may be cut in any other suitable manner or by any of the well known means employed in gear cutting practice.

Referring to the accompanying drawing.

Figure 1:
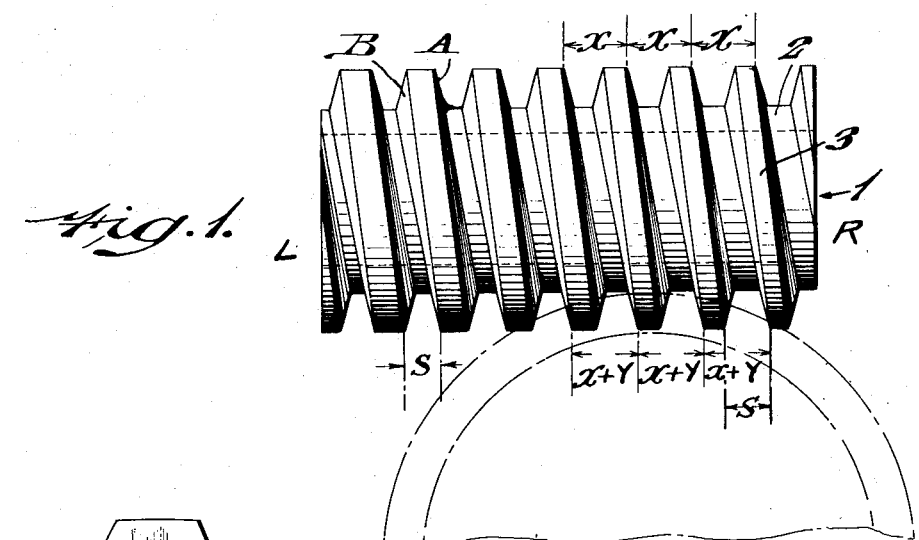
Fig. 1 represents a view in side elevation of a worm embodying my invention.
Figure 3:
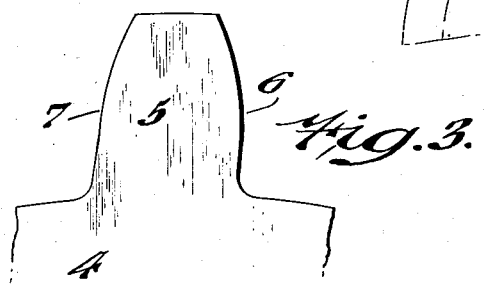
Fig. 3 represents, on an enlarged scale, a view in side elevation of one of the teeth of the worm wheel shown in Fig. 2.
Figure 2:
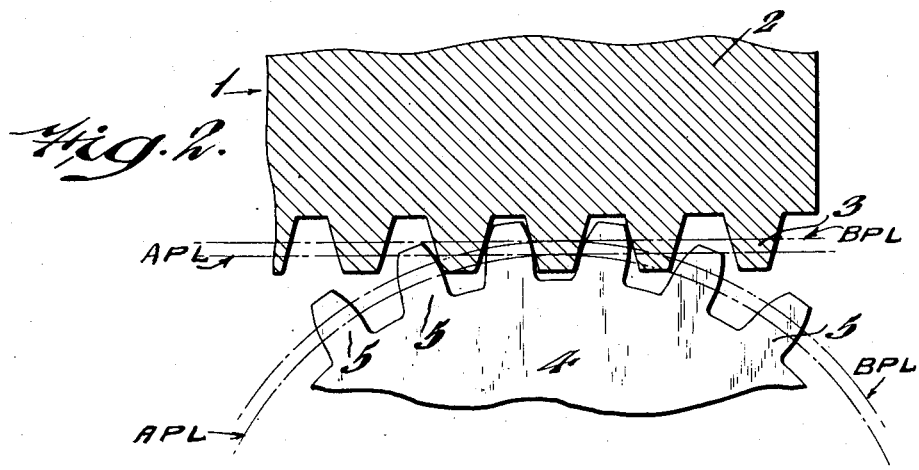
Fig. 2 represents a fragmentary vertical sectional view, on an enlarged scale, illustrating the meshing of the worm shown in Fig. 1 with a worm wheel.

Referring to the drawing, in which like reference characters indicate like parts, 1 designates a worm having the body 2 and the worm thread 3. The worm thread 3 has a constant axial pitch A on one side of the face thereof and a different constant axial pitch B on the other side of the face thereof. As will be apparent from Fig. 1, the cross section or width of the thread 3 increases from the right end R of the worm towards the left end L thereof, while the width of the spaces S intervening between the successive convolutions of the thread on the worm increases from the left end L of the worm to the right end R thereof, all measurements being taken along a line parallel to the axis of said worm. As shown in dotted lines at the top and bottom of Fig. 1, the axial pitches A and B are constant throughout the length of the worm, although one of said pitches is somewhat smaller than the other. Thus if the smaller axial pitch A is represented by $x$, the larger circular pitch B will be represented by $x+y$ and the excess or the difference $y$ between the two axial pitches A and B is added cumulatively to each successive convolution of the thread and concomitantly deducted from the width of the spaces intervening between the convolutions of the thread 3. The worm wheel 4 is provided with the desired number of teeth 5 of identical contour, the teeth of this worm wheel having been preferably generated by a hob constructed from and representing the worm 1, so that the opposite profile bearing sides of the teeth 5 of the worm wheel 4 are adapted to produce a maximum profile bearing engagement with the corresponding opposite axial pitches of the worm thread 3.

When the worm and the worm wheel are both new, the worm is engaged at its right end R with the worm wheel 4, that is, at that portion of the worm where the cross section or thickness of the worm thread is least and the spaces intervening between the worm thread convolutions are at their greatest. As the profile bearing surfaces of the worm thread and the teeth of the worm wheel wear out, the worm 1 is advanced towards the fixed worm wheel without varying the center distance between the worm and the worm wheel to bring the center portion of the worm thread into contact with the worm wheel teeth, and the increased thickness of the worm thread together with the decreased space intervening between the convolutions of the worm thread serve to provide a snug fit between the profile bearing surfaces of the worm thread and the worm wheel teeth, to take up any looseness or back-lash that may have developed as a result of wear on said parts.

While I have shown and described a particular embodiment of my invention, I do not wish to limit myself to the exact form shown, since the particular construction shown and described is intended as illustrative rather than delimitive of the invention. The principle underlying my invention can be applied to other forms of worm gearing known to the art and not hereinabove specifically referred to, illustrated or described. While I have described the worm wheel 4 as being generated from a hob constructed from and representing the worm 1, it is to be understood that the worm wheel teeth can be cut in any other suitable manner which will produce the teeth 5 having the bearing profile 6 thereof corresponding to and adapted for satisfactory meshing with the axial pitch B of the worm thread 3 and having the opposite profile bearing 7 thereof corresponding to and adapted for satisfactory meshing with the axial pitch A of said worm thread 3.

Having thus described my invention, what I claim as new and desire to secure by Letters Patent is:

1. A worm, the thread of which is provided with a constant axial pitch on one face or profile bearing surface thereof and a different constant axial pitch on the other face or profile bearing surface thereof.

2. A worm, the thread of which is provided with a constant axial pitch on one face or profile bearing surface thereof and a different constant axial pitch on the other face or profile bearing surface thereof, in combination with a worm wheel having teeth cut for meshing with said worm thread.

3. A worm having a thread of a constantly increasing width from one end of said worm to the other end thereof, measured along a line parallel to the axis of said worm.

4. A worm having a thread of a constantly increasing width from one end of said worm to the other end thereof, measured along a line parallel to the axis of said worm, the width of the spaces intervening between the convolutions of said thread decreasing in the opposite direction, measured along the same line.

5. In worm gearing a worm having a thread provided with different but constant axial pitches on the opposite faces thereof, and a worm wheel, the teeth of which have opposite side curvatures developed from the corresponding opposite different axial pitches of said worm thread.

6. In worm gearing a worm having a thread provided with opposite constant but different axial pitches, and a worm gear, the teeth of which are generated by a hob constructed from and representing said worm.

JOHN J. ROBAK.